United States Patent
Pouzet et al.

(10) Patent No.: US 9,494,042 B2
(45) Date of Patent: Nov. 15, 2016

(54) SEALING RING FOR A TURBINE STAGE OF AN AIRCRAFT TURBOMACHINE, COMPRISING SLOTTED ANTI-ROTATION PEGS

(75) Inventors: Emilie Pouzet, Fontainebleau (FR); Pascal Casaliggi, Montreuil (FR); Didier Pasquiet, Boissie le Roi (FR)

(73) Assignee: SNECMA, Paris (FR)

( * ) Notice: Subject to any disclaimer, the term of this patent is extended or adjusted under 35 U.S.C. 154(b) by 493 days.

(21) Appl. No.: 14/009,302

(22) PCT Filed: Mar. 29, 2012

(86) PCT No.: PCT/FR2012/050667
§ 371 (c)(1),
(2), (4) Date: Oct. 1, 2013

(87) PCT Pub. No.: WO2012/136917
PCT Pub. Date: Oct. 11, 2012

(65) Prior Publication Data
US 2015/0159496 A1 Jun. 11, 2015

(30) Foreign Application Priority Data
Apr. 5, 2011 (FR) ...................................... 11 52928

(51) Int. Cl.
F01D 11/00 (2006.01)
F01D 5/30 (2006.01)
F01D 5/32 (2006.01)

(52) U.S. Cl.
CPC ........... *F01D 11/006* (2013.01); *F01D 5/3015* (2013.01); *F01D 5/323* (2013.01); *F01D 11/005* (2013.01); *F05D 2260/60* (2013.01); *Y02T 50/673* (2013.01); *Y10T 29/49995* (2015.01)

(58) Field of Classification Search
CPC ... F01D 5/3015; F01D 11/005; F01D 11/006
USPC ....... 416/204 A, 218, 220 AR, 244 A, 244 R
See application file for complete search history.

(56) References Cited

U.S. PATENT DOCUMENTS 3,266,770 A * 8/1966 Harlow ................... F01D 5/081
416/174
4,189,282 A * 2/1980 Benoist ................. F01D 5/3015
416/193 A
(Continued)

FOREIGN PATENT DOCUMENTS

EP 1 096 107 5/2001
EP 1 439 282 7/2004
(Continued)

OTHER PUBLICATIONS

International Search Report Issued Jun. 4, 2012 in PCT/FR12/050667 Filed Mar. 29, 2012.

*Primary Examiner* — Woody Lee, Jr.
(74) *Attorney, Agent, or Firm* — Oblon, McClelland, Maier & Neustadt, L.L.P.

(57) ABSTRACT

A sealing ring configured to be pressed against a rotor disc of a turbine stage for an aircraft turbomachine, the ring including a plurality of anti-rotation pegs which prevent it from rotating in relation to the rotor disc, each peg protruding axially from a ring body and including two opposite circumferential-end surfaces, respectively configured to be located facing two directly consecutive blades carried on the rotor disc. An axially opening slot passes radially through at least one of the anti-rotation pegs.

10 Claims, 6 Drawing Sheets

(56) References Cited

U.S. PATENT DOCUMENTS

| | | | | |
|---|---|---|---|---|
| 5,211,407 A | * | 5/1993 | Glynn | F01D 11/006 277/632 |
| 5,318,405 A | * | 6/1994 | Meade | F01D 5/3015 416/220 R |
| 5,330,324 A | | 7/1994 | Agram et al. | |
| 6,190,131 B1 | * | 2/2001 | Deallenbach | F01D 5/027 416/144 |
| 6,494,684 B1 | | 12/2002 | Wagner | |
| 2005/0175459 A1 | | 8/2005 | Gagner | |
| 2008/0008593 A1 | * | 1/2008 | Zagar | F01D 5/3015 416/220 R |
| 2011/0176923 A1 | * | 7/2011 | Haffner | F01D 5/3015 416/220 R |

FOREIGN PATENT DOCUMENTS

| | | |
|---|---|---|
| FR | 2 393 931 | 1/1979 |
| FR | 2 913 064 | 8/2008 |
| GB | 2 270 544 | 3/1994 |

\* cited by examiner

SEALING RING FOR A TURBINE STAGE OF AN AIRCRAFT TURBOMACHINE, COMPRISING SLOTTED ANTI-ROTATION PEGS

TECHNICAL FIELD

This invention relates to the field of turbines for an aircraft turbomachine, in particular for aircraft turbojets or turboprop engines.

The invention in particular relates to the downstream sealing ring of a turbine stage, intended to contact in a sealed manner the blades mounted on a rotor disc of the turbine stage. More precisely, the invention relates to the anti-rotation pegs provided on this ring, and which prevent the latter from rotating in relation to the rotor disc.

PRIOR ART

The rotor of a turbine stage of an aircraft turbojet comprises a disc, blades mounted on the disc at its periphery, and a downstream ring mounted downstream of the turbine disc/blade unit. In a known manner, the rotor is driven in rotation by the flowing of a gas flow from the upstream to the downstream through the turbine.

For the mounting of the blades, the disc is provided with peripheral teeth delimiting between them cells wherein the roots of the blades are retained radially.

In prior art, it is known to mount the downstream sealing ring against the downstream face of the disc/blade unit, in order to obtain the best possible seal.

The ring is moreover provided with a plurality of anti-rotation pegs, for example three pegs arranged at 120°, protruding axially from a ring body. These pegs prevent the ring from rotating in relation to the rotor disc. To do this, each peg has two opposite circumferential-end surfaces, respectively intended to be located facing two directly consecutive blades carried on the rotor disc. These surfaces therefore constitute tangential stops provided to come into contact with the blades, and as such prohibit the relative rotation between the ring and the disc/blade unit.

In operation, the pegs undergo substantial tangential stress, in particular at a high rotation speed. The most critical zones are constituted by the connecting radii between the circumferential-end surfaces, and a support surface for pegs provided on the ring body. These two connecting radii are effectively of very low values, for example close to 0.1 mm, and undergo a very high tangential stress, rendering these radii critical in the lifespan of the ring.

In order to solve this problem of stress impacting the lifespan of the ring, it is possible to increase the value of the aforementioned connecting radii. Nevertheless, this solution is not satisfactory because it generates interference problems with the root of the two blades.

Another solution also considered consists in making pits on two connecting radii, by creating indentations at the base of the two circumferential-end surfaces, in order to overcome the problem of interferences with the blade roots. However, these pits reduce the surface area of the circumferential-end surfaces, and render them less effective in their rotation prevention function. In addition, the machining of these pits is complicated to implement.

DESCRIPTION OF THE INVENTION

The invention therefore has for purpose to overcome the problems mentioned hereinabove at least partially, in relation to the realisations of prior art.

To do this, the invention has first of all for object a sealing ring intended to be pressed against a rotor disc of a turbine stage for aircraft turbomachine, said ring being provided with a plurality of anti-rotation pegs which prevent said ring from rotating in relation to the rotor disc, each peg protruding axially from a ring body and having two opposite circumferential-end surfaces, respectively intended to be located facing two directly consecutive blades carried on the rotor disc. According to the invention, an axially opening slot passes radially through at least one of said anti-rotation pegs.

The invention is therefore remarkable in that it constitutes a solution that is simple, effective and easy to implement in order to reduce the tangential stress on at least one of the anti-rotation pegs, and more preferably on all of these pegs. The presence of the slot passing through the anti-rotation peg makes it possible indeed to split the latter into two half-pegs each having a lower stiffness, which therefore provides them with a higher deformation capacity under stress, accompanied by a drop in the tangential stress to which they are subjected. In this respect, it has been observed that the maximum tangential stress, observed on the connecting radii of the tangential-end surfaces, can be decreased by at least 20% thanks to the simple presence of the slot specific to this invention.

The invention is particularly advantageous in that it provides a solution that does not require modifying the value of the aforementioned connecting radii, established in order to obtain a satisfactory cooperation between the pegs and the blade roots, without interferences. This solution also does not generate a decrease in the axial length of the tangential-end surfaces, in such a way that the latter can fulfil their function as a circumferential stop in a satisfactory manner.

The invention is also advantageous in that it can be implemented on existing rings, simply by creating slots on their anti-rotation pegs, more preferably by machining.

It is noted that the ring according to the invention is preferably intended to constitute a downstream sealing ring for the rotor of a turbine stage, but that is could possibly be used as an upstream ring, without leaving the scope of the invention.

More preferably, each of the two opposite circumferential-end surfaces is connected to a support surface for pegs, provided on the ring body, by a first connecting radius. In addition, each of the two lateral flanks of the slot is connected to the bottom of this slot by a second connecting radius, and it is done in such a way that the second radius is strictly greater than the first connecting radius. In this way, the second connecting radius is subjected to a tangential stress that is even lower than that that is applied on the first connecting radius. As no surrounding element is normally provided to cooperate directly with the slot, the second connecting radius is therefore not subject to problems of interferences.

The ratio between the two connecting radii is more preferably greater than eight, and can go beyond ten.

In order to further increase the effectiveness of the unloading of the stress procured by the slot, it is more preferably done in such a way that the bottom of the slot of each peg is located axially at the same level or in the vicinity of the base of said peg.

Moreover, for an entirely optimised compromise in terms of the effectiveness in unloading the stress, total mass, and mechanical resistance of the half-pegs separated by the slot, in particular concerning the resistance to shearing, it is provided that the ratio between the width of the slot and the total width of said anti-rotation peg, according to the circumferential direction, is more preferably between 0.3 and 0.4.

More preferably, the slot is centred on said anti-rotation peg. Alternatively, it could be offset towards one or the other of the circumferential-end surfaces, without leaving the scope of the invention.

More preferably, the ring has three anti-rotation pegs arranged at 120° in relation to one another.

Finally, said anti-rotation pegs are more preferably arranged in the vicinity of an external radial end of said ring body, even if there could be another arrangement, without leaving the scope of the invention.

The invention also has for object a rotor of a turbine stage of an aircraft turbomachine, comprising a disc, blades mounted on the disc, and a downstream sealing ring such as described hereinabove, mounted downstream of the disc and of the blades.

The invention has for object a turbomachine for aircraft, comprising at least one such turbine comprising at least one turbine stage rotor such as described hereinabove.

Finally, the invention also has for object a method for manufacturing a sealing ring such as described hereinabove, wherein the slot of said anti-rotation peg is carried out by machining.

Other advantages and characteristics of the invention shall appear in the detailed non-restricting description hereinbelow.

BRIEF DESCRIPTION OF THE DRAWINGS

The invention shall be better understood, and other details, advantages and characteristics of the latter shall appear when reading the following description given by way of a non-restricting example and in reference to the annexed drawings wherein.

In these figures, identical or similar elements are designated by identical numeric references.

DETAILED DESCRIPTION OF A PREFERRED EMBODIMENT

Figure 1:
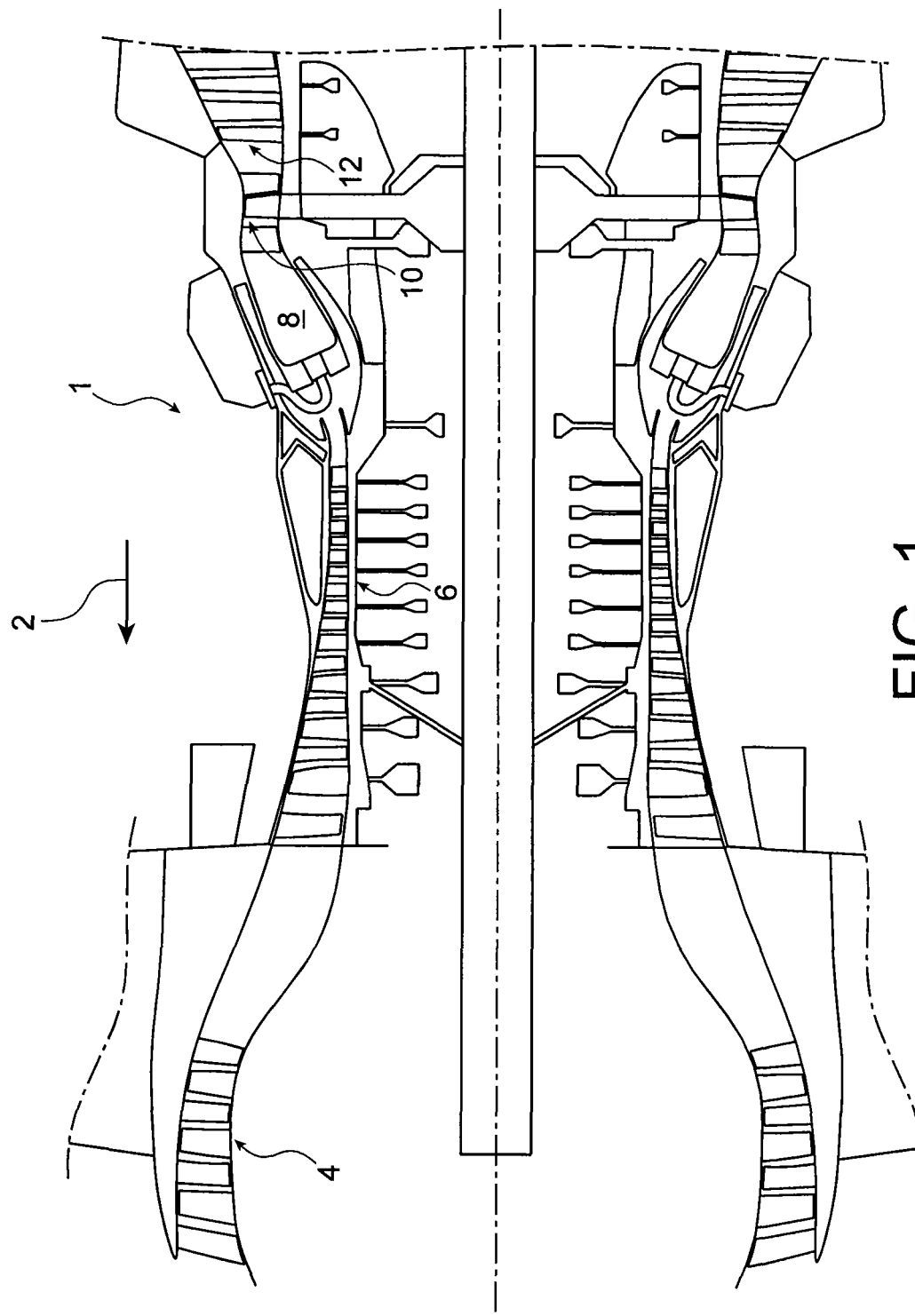
FIG. 1 is a partial diagrammatical axial cross-section view of an aircraft turbomachine comprising a high-pressure turbine according to a preferred embodiment of this invention.

In reference first of all to FIG. 1, an aircraft turbomachine 1 can be seen, of the double-flow and double-body type.

The turbojet comprises, successively according to the direction of thrust shown by the arrow 2, a low-pressure compressor 4, a high-pressure compressor 6, a combustion chamber 8, a high-pressure turbine 10 and a low-pressure turbine 12.

The high-pressure turbine 10, of the single-stage type, is presented in the form of a preferred embodiment of this invention, for which details shall now be provided in reference to FIGS. 2 to 7.

The turbine comprises a stage rotor 20 which is located downstream of a high-pressure distributor 24, belonging to the previous stage. Downstream of the rotor 20 is located a fixed portion 22 of the turbojet, corresponding to the inlet of the low-pressure turbine.

First of all, the rotor 20 comprises a disc 26 of which the radially external periphery has teeth 28 each spaced circumferentially from one another. Cells 30 are defined between the teeth of the disc. They are axial or slanted, open both onto the upstream face 31 and onto the downstream face 33 of the disc 26. Conventionally, each cell 30 receives the root 32 of a blade 34, in order to retain it radially towards the exterior, via cooperation of form.

The root 32 of each blade 34 is located at a distance from the bottom 36 of its associated cell 30, according to the radial direction. As such, a free space 38 is formed between the end of the root 32 and the bottom of the cell 36.

Upstream, the root 32 can possibly be extended radially towards the interior by a first wall 40, downstream as well, the root 32 is extended radially towards the interior by a second wall 42.

Figure 2:
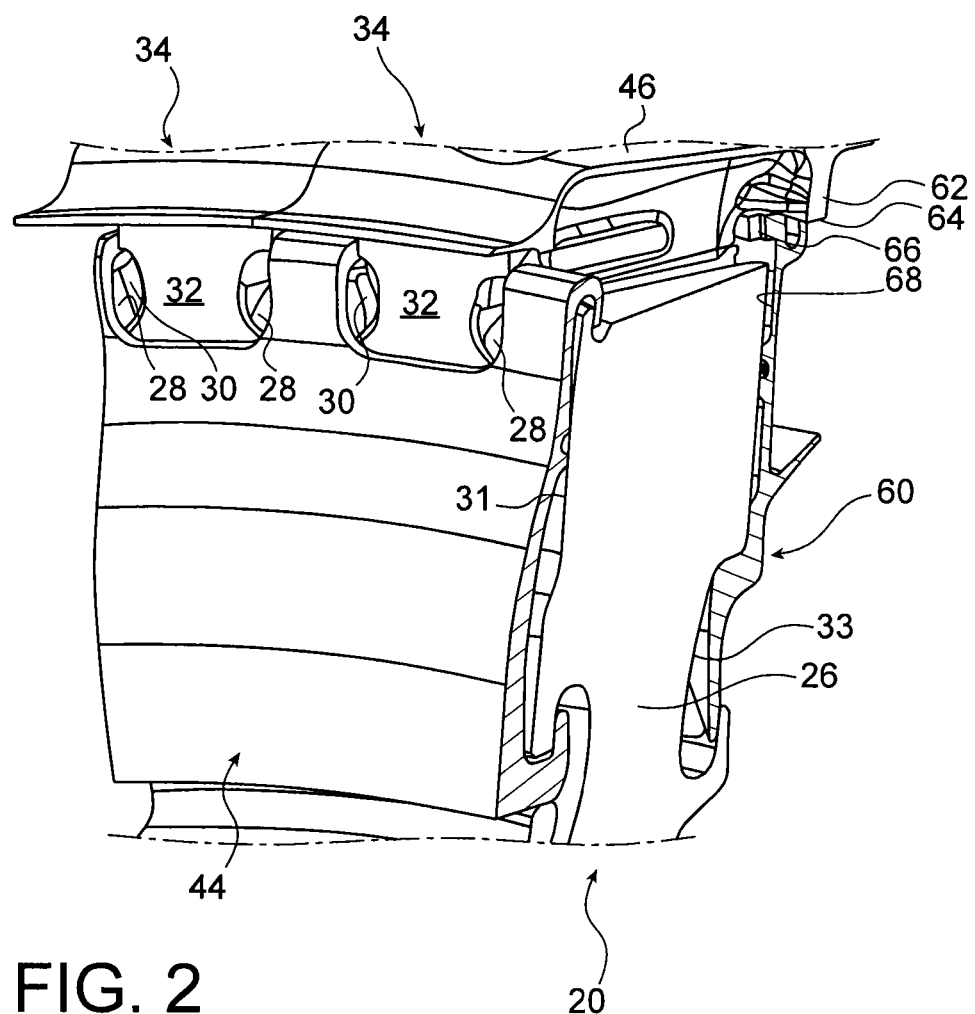
FIG. 2 is a partial perspective view of the rotor of a stage of the high-pressure turbine shown in the preceding figure.
Figure 3:
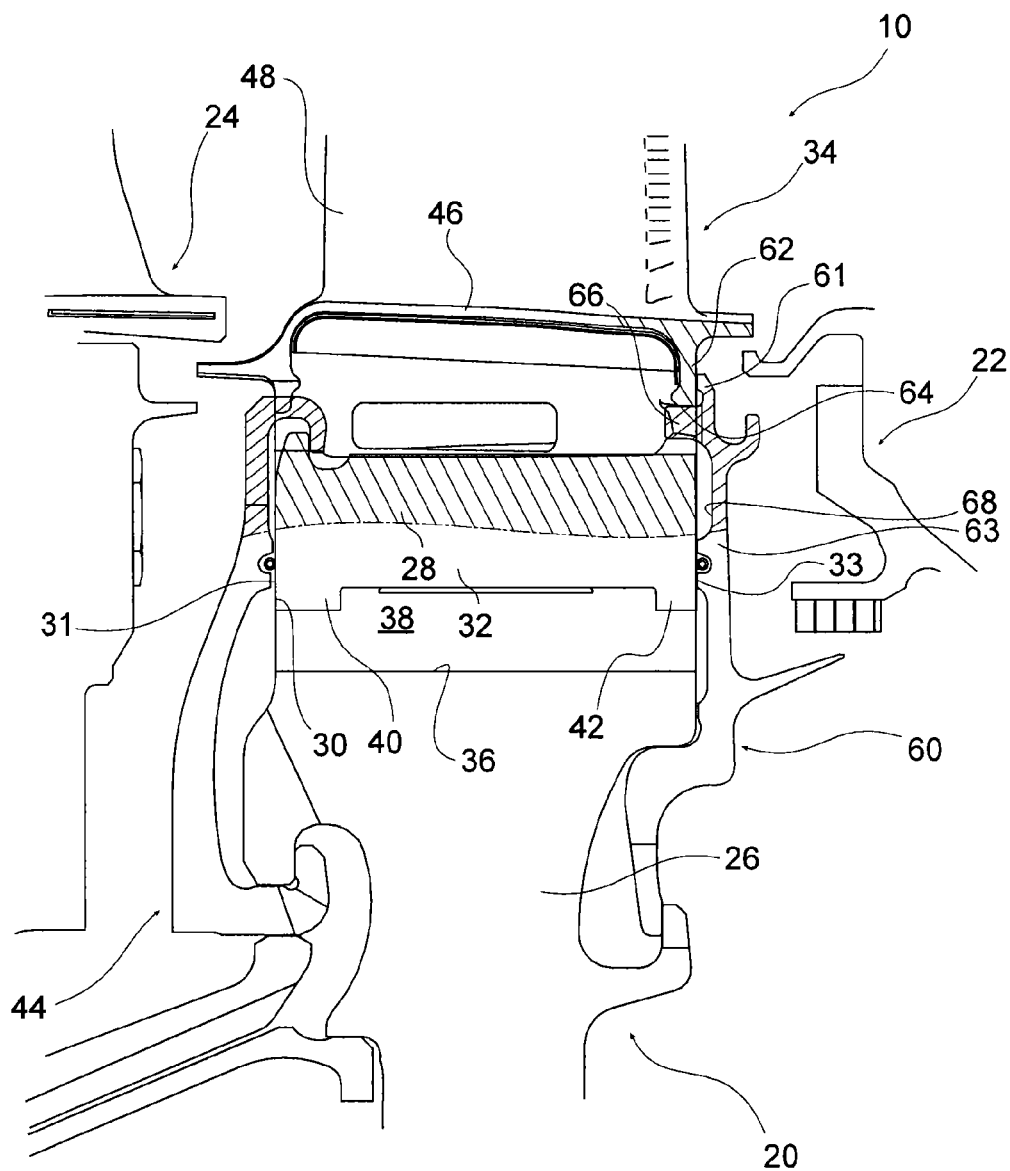
FIG. 3 is a partial diagrammatical axial cross-section half-view of the rotor shown in the preceding figure.
Figure 4:
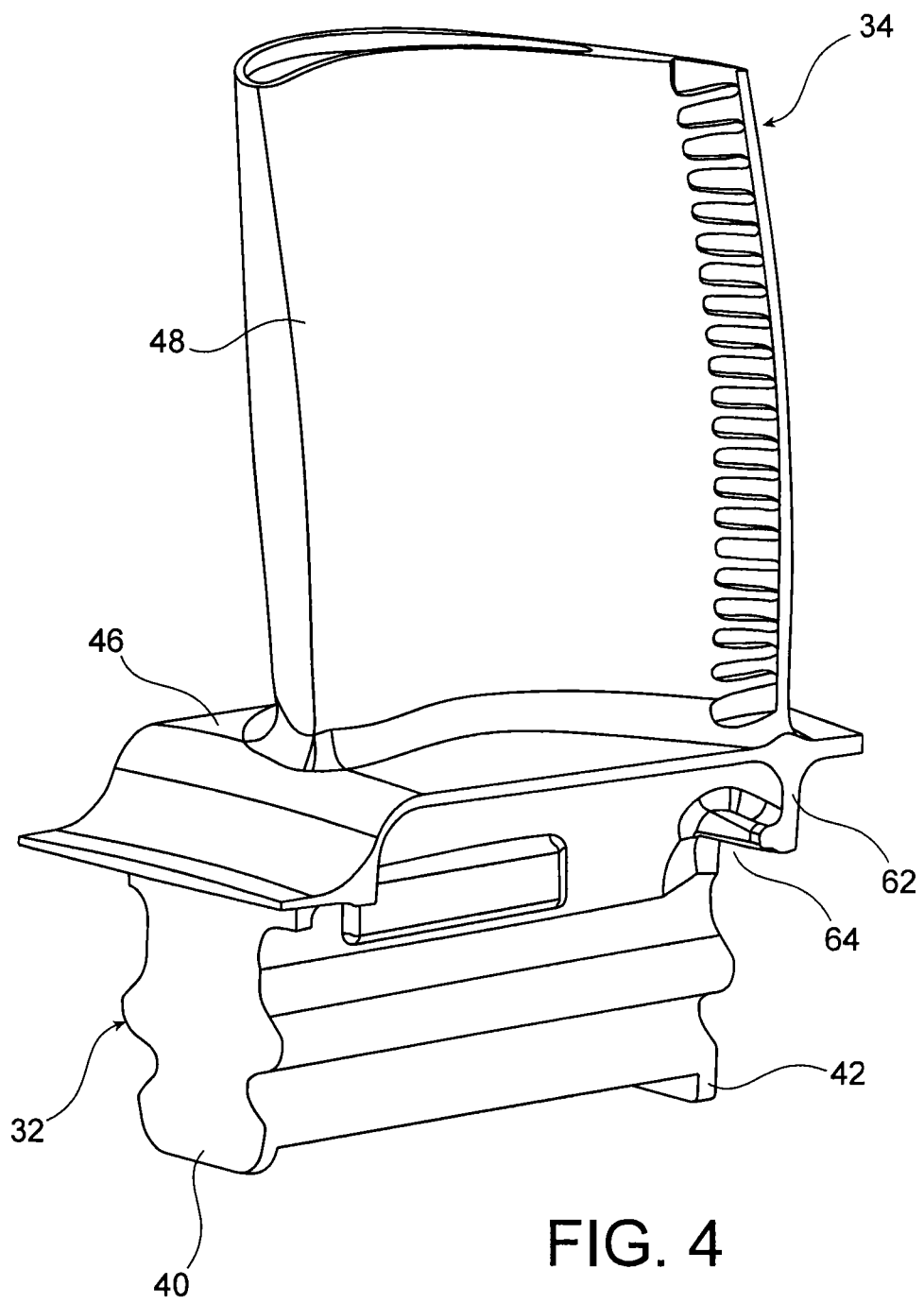
FIG. 4 is a perspective view of one of the turbine blades of the rotor shown in the FIGS. 2 and 3.

Furthermore, each blade 34 comprises at its base a platform 46 intended in particular to guide the flow from upstream to downstream in the turbine, i.e. from the inlet towards the outlet of the turbine, of a primary flow of gas coming from the combustion chamber. This platform 46, arranged between the root 32 and the aerodynamic propeller 48 of the blade, extends circumferentially on either side of this propeller 48. It is conventionally located in the extension of an identical platform belonging to a directly consecutive blade, as can be seen in FIG. 2.

The rotor 20 incorporates an upstream sealing ring 44 carried by the disc 26 on the upstream face 31 of the latter. The upstream ring 44 participates in particular in the axial retaining of the blades in the cells, towards the front.

The rotor 20 further incorporates a downstream sealing ring 60 carried by the disc 26 on the downstream face 33 of the latter. The annular ring 60 has an external radial end in the shape of a peripheral edge 61 intended to press against a tab 62 of downstream support of the platform 46, which extends under the platform according to a circumferential length that is longer than that of the foot that carried this tab 62, with this length being however substantially identical to that of the platform. Free spaces 64 are then created located under the tabs 62, delimited circumferentially by the upper portion of the blade roots, and delimited radially between the tabs 62 and the upper face of the disc teeth 28. Pegs 66 protruding axially upstream from an upstream face 68 of the downstream ring pass axially through the spaces 64, locally taking the form of a support surface for these pegs. Three pegs 66 are more preferably provided, distributed at 120° over the ring body from which they protrude, from the support surface 68 substantially oriented according to a transverse plane. These pegs 66 make it possible to provide an anti-rotation function to the downstream ring, in relation to the disc/blade unit. They are located in the vicinity of the peripheral edge 61 of the ring, by being arranged radially towards the interior in relation to this edge 61 also protruding axially upstream.

Figure 5:
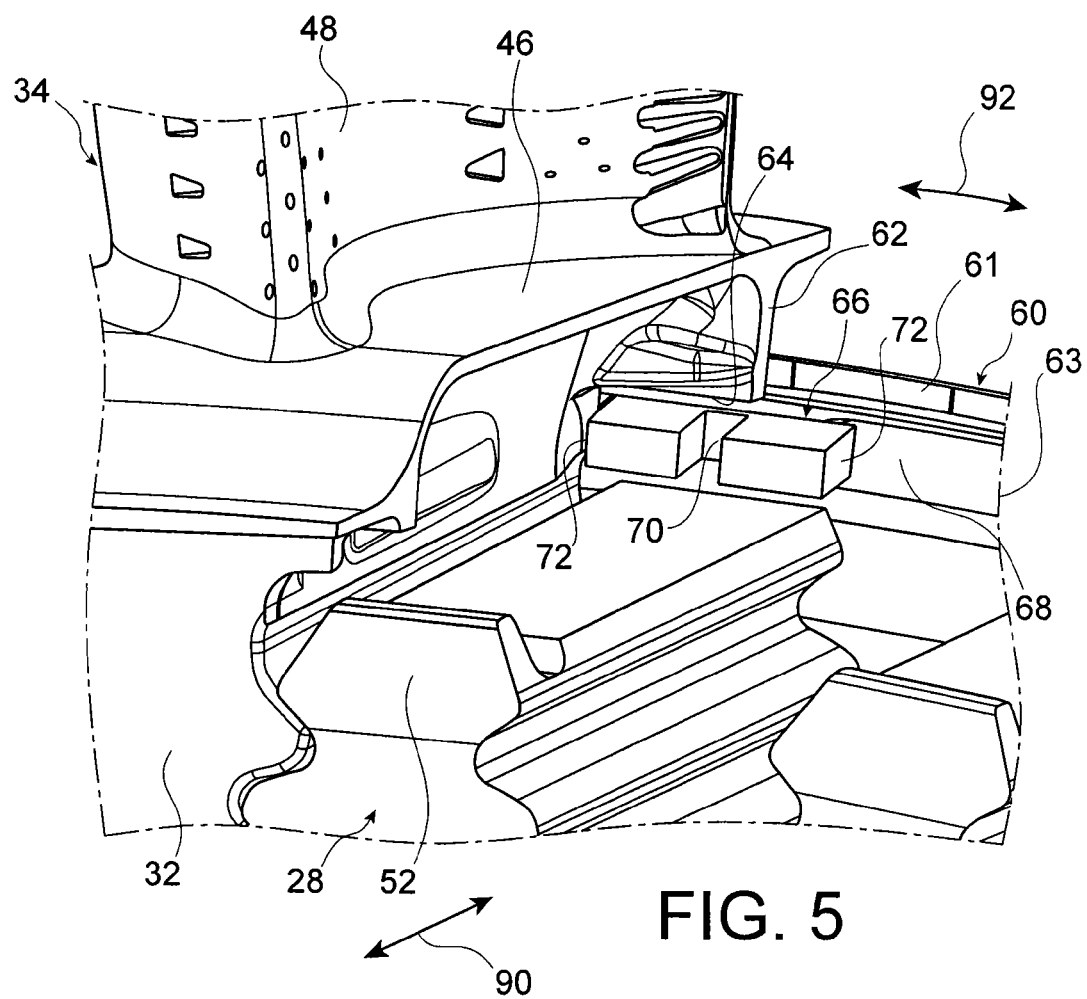
FIG. 5 shows a view similar to that of FIG. 2, showing in a more precise manner one of the anti-rotation pegs of the downstream ring.
Figure 6:
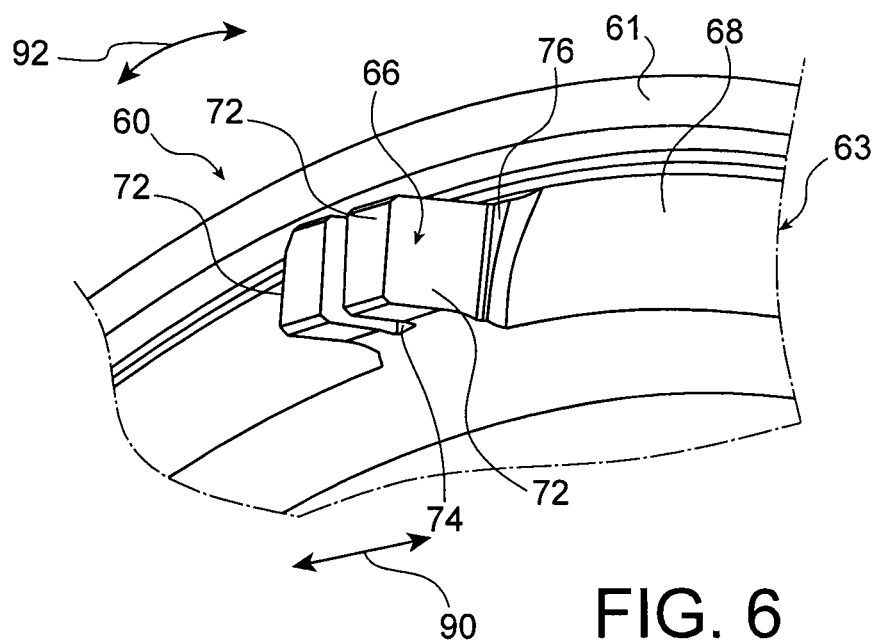
FIG. 6 also shows a partial perspective view of the downstream ring and of one of its anti-rotation pegs.
Figure 7:
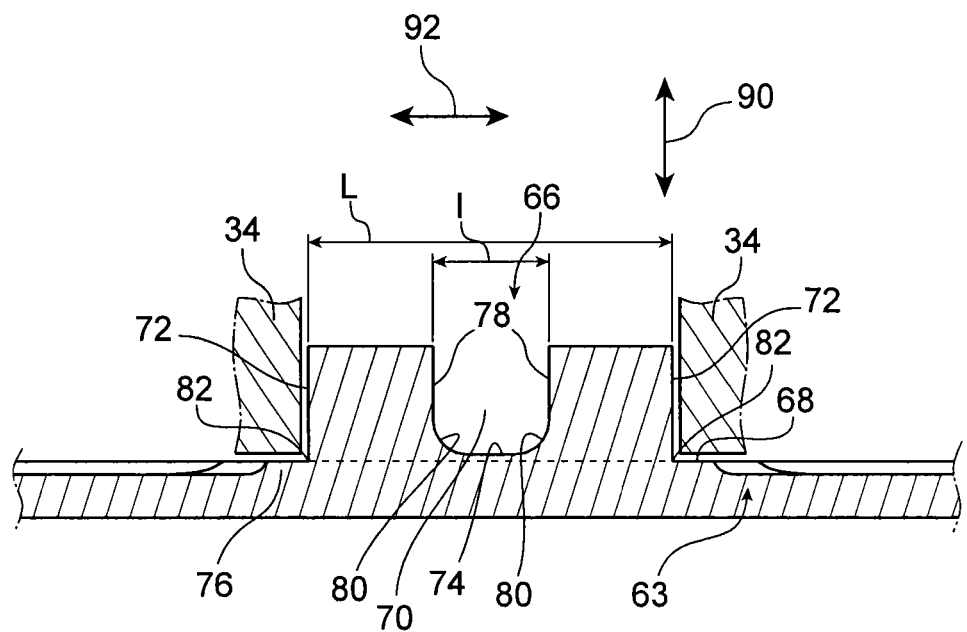
FIG. 7 shows a cross-section view of the anti-rotation peg shown in the preceding figure, taken along the line A-A of this FIG. 6.

One of the particularities of this invention resides in the design of the anti-rotation pegs 66, of which a preferred embodiment shall now be described, substantially in reference to FIGS. 5 to 7.

Each peg 66 has two opposite circumferential-end surfaces 72, respectively intended to be located facing two directly consecutive feet of blades 34. The two surfaces 72, facing complementary surfaces provided on the blade roots, are used to prevent the relative rotation between the ring 60 and the disc/blade unit, according to the axis of rotation of this unit. A mounting clearance is nevertheless provided between these surfaces cooperating two-by-two, and substantially oriented in parallel to the axial 90 and circumferential 92 directions. The surfaces 72, used as stops, are also substantially orthogonal to the support surface for pegs 68, from which they protrude.

Moreover, a slot 70 passes radially through each peg 66, which opens therefore radially towards the interior and towards the exterior, and which open axially upstream. In this respect, the slot 70 here has a preferred shape with a generally U-shaped section, as can be best seen in FIG. 7. Other shapes could be nevertheless adopted, without leaving the scope of the invention.

The slot 70, of which the bottom 74 is oriented axially in the upstream direction, thus delimits two half-pegs spaced circumferentially from one another. The bottom 74 is located substantially at the same level, according to the axial direction 90, than the support surface 68 for pegs, and therefore substantially at the same level as the base of its associated peg 66, as can be seen in FIG. 7. In this respect, in the FIGS. 6 and 7, it is possible to see that the support surface for pegs 68 can have, for reasons of manufacture, in particular machining of the pegs on the ring carried out as a single part, axial steps 76 protruding upstream, each carrying a peg 66. In such a case, the slot bottom 74 is then located substantially at the same level as the step 76 of the support surface 68 for pegs.

The slot 70, preferably centred on the peg, therefore has a U-shaped section of which the two lateral flanks 78 are carried out at the bottom 74 respectively by two connecting radii 80, more preferably identical, for example of a value of a magnitude of 1 mm.

These radii 80 are high in comparison with the connecting radii 82 between the surfaces of the stop 72 and the support surface of pegs 68. These radii, more preferably also identical, have for example a value of a magnitude of 0.1 mm, entirely adapted for bringing the peg 66 as close as possible to the blade roots, without interferences.

Finally, the slot 66 has a circumferential width "I" between 0.3 and 0.4 times the total width "L" of the peg, according to this same circumferential direction 92. More preferably, the ratio between the widths "I" and "L" is one third.

Of course, various modifications can be made by those skilled in the art to the invention which has just been described, solely by way of non-restricting examples.

The invention claimed is:

1. A sealing ring configured to be pressed against a rotor disc of a turbine stage for an aircraft turbomachine, the ring comprising:
   a plurality of anti-rotation pegs which prevent the ring from rotating in relation to the rotor disc, each peg protruding axially from a ring body and including two opposite circumferential-end surfaces, respectively configured to be located facing two directly consecutive blades carried on the rotor disc; and
   an axially opening slot extending toward the rotor disc and passing radially through at least one of the anti-rotation pegs.

2. The sealing ring according to claim 1, wherein each of the two opposite circumferential-end surfaces is connected to a support surface of pegs, provided on the ring body, by a first connecting radius,
   wherein each of two lateral flanks of the slot is connected at a bottom of the slot by a second connecting radius, and
   wherein the second connecting radius is strictly greater than the first connecting radius.

3. The sealing ring according to claim 2, wherein the bottom of the slot of each peg is located axially at a same level or in a vicinity of a base of each peg.

4. The sealing ring as claimed in claim 1, wherein a ratio between a width of the slot and a total width of the at least one of the anti-rotation pegs, according to a circumferential direction, is between 0.3 and 0.4.

5. The sealing ring as claimed in claim 1, wherein the slot is centered on the at least one of the anti-rotation pegs.

6. The sealing ring as claimed in claim 1, comprising three of the anti-rotation pegs arranged at 120° in relation to one another.

7. The sealing ring as claimed in claim 1, wherein the anti-rotation pegs are arranged in a vicinity of an external radial end of the ring body.

8. A rotor of a turbine stage for an aircraft turbomachine, comprising:
   the sealing ring as claimed in claim 1;
   the rotor disc; and
   the blades mounted on the rotor disc, wherein
   the sealing ring is downstream from the rotor disc.

9. A turbomachine for an aircraft, comprising at least one turbine comprising at least one of the rotor of the turbine stage according to claim 8.

10. A method for manufacturing the sealing ring according to claim 1, wherein the slot of the at least one of the anti-rotation pegs is formed by machining.

* * * * *